In FIG. 8 and FIG. 9 is a module 53 prepared for use with a Hepa filter 54. The structure of the module 53 provides easy access to and removal of the Hepa filter 54. The intermediate plate 30 can be removed by unscrewing sheet metal screws 34. With screws removed, the plate 30 is free to drop to a vertical position where it is supported by cables 55 which are fastened to the intermediate flange 33.

The Hepa filter 54 can be removed by unscrewing a series of intermittently spaced wing nuts 56, which secures a Z-shaped bracket 57 to a top plate 58. The bracket 57 in turn holds a protruding flange 59 around the base of the Hepa filter 54 between an upper and lower neoprene gasket 60/61 forming a seal 62 preventing air from by-passing the filter 54. As noted before, the system is balanced with the filters 54 removed.

When it becomes necessary to replace the filter 54, the air through the module 53 must be closed off by shutting an air control valve 63. By providing the valve 63 ahead of the filter 54, replacement can be completed without compromising the environmental quality in the work space. Such a compromise could occur if the total system had to shut down since a positive air pressure is maintained in the work space to prevent the accidental entrance of non-filtered air. Likewise, a compromise would occur if there was a discharge from the module 53 without the Hepa filter 54 in place. With the air control valve 63 closed, air is prevented from entering an oval-shaped air inlet 64 into a filter chamber 65. This chamber 65 is defined by the top plate 58 and a filter cover box 66 which encloses the upstream side of the Hepa filter 54.

The air control valve 63 consists of a vertically mounted gate 67 slidably secured by two Z-shaped brackets 68 carried by the cover box 66, one each adjacent to the elongated ends of the inlet 64. The gate 67 has a horizontal right angle flange 69 extending inwardly which is threadly engaged with a vertically mounted adjacent screw 70. This screw 70 is mounted in a bearing-like grommet 71 carried in the top plate 58. The screw 70 has a slotted head 72 which extends through a hole 72a in the intermediate plate 30 allowing accessibility and easy adjustment of valve 63 when the air diffusion plate 21 is released.

It is necessary to count the number of revolutions required to turn the adjacent screw 70 to close valve 63. By rotating screw 70 the same number of turns, but in the opposite direction, the valve 63 is returned to its original location avoiding unbalancing the system after filter 54 has been replaced and the module 53 is returned to service. Since the amount of air passing through each module 53 is approximately the same, each filter becomes contaminated at the similar rate. Therefore, all of the filters should be changed at the same time. The lower portion of the module 53 is identical to that of module 12 having a perforated bottom plate 21, and two air diffusion units 29 located below orifice openings 35.

To facilitate the assembly of the frame body 23, the frame members 22 can be made as an extrusion. By so forming, the top flange 42, the intermediate flange 33, the bottom edge 25 and the support flange 24 become an integral part of the frame member 22. The extrusion is cut to a desired length and each end mitered at a 45 degree angle. The extruded frame member 22 has an inner longitudinal channel 73. The module body 23 is assembled by mating the mitered ends of the frame members 22 after a right angle corner plate 74 has had its legs 75 and 76 inserted into the respective channel 73 in each frame member 22. The legs 75/76 of corner plate 74 then are tacked to the respective channels 73.

While various modifications may be suggested by those versed in the art, it should be appreciated that I wish to embody within the scope of the patent warranted herein, all such modifications as reasonably and properly come within the scope of my contribution to the art.

I claim as my invention:

1. A method of balancing air volume output from laminar air flow diffusion modules having approximately equal outlet surface areas installed in a work space where the ambient air surrounding a performance of a task must be conditioned to a certain standard which includes the following steps:
    a. connecting inlets of said modules to an air supply means, said means supplying air to said modules,
    b. placing respective air diffusion plates carried in a bottom portion of each module in an open position,
    c. placing respective air diffusion units carried by each module adjacent to and upstream from said plate in an open position,
    d. setting respective air volume control valves carried by each module adjacent to and downstream from said inlet in a maximum open position,
    e. measuring the velocity of the supplied air with an anemometer as said air passes through an orifice opening in an intermediate plate, said plate being carried by each module and located between said air diffusion unit and said air volume control valve,
    f. selectively adjusting the air volume control valve such that the measured velocity of the air passing through each orifice opening equals all other measured velocities within 10 percent, and
    g. placing each air diffusion unit and each air diffusion plate to a normal position,
    wherein said modules deliver to said work space air having a uniform laminar downward flow so as to maintain the ambient air surrounding the performance of the task within said standards of conditioning.

2. A method of balancing air volume output from laminar air flow diffusion modules having varying outlet surface areas installed in a work space where the ambient air surrounding a performance of a task must be conditioned to a certain standard which includes the following steps:
    a. connecting inlets of said modules to an air supply means, said means supplying air to said modules,
    b. placing respective air diffusion plates carried in a bottom portion of each module in an open position,
    c. placing respective air diffusion units carried by each module adjacent to and upstream from said plate in an open position,
    d. setting respective air volume control valves carried by each module adjacent to and downstream from said inlet in a maximum open position,
    e. measuring the velocity of the air with an anemometer as said air passes through an orifice opening in an intermediate plate, said plate being carried by each module and located between said control valve and said air diffusion unit, adjusting said measurement to compensate for the module outlet surface areas,
    f. selectively adjusting the air control valve such that the adjusted measured velocity of the air passing

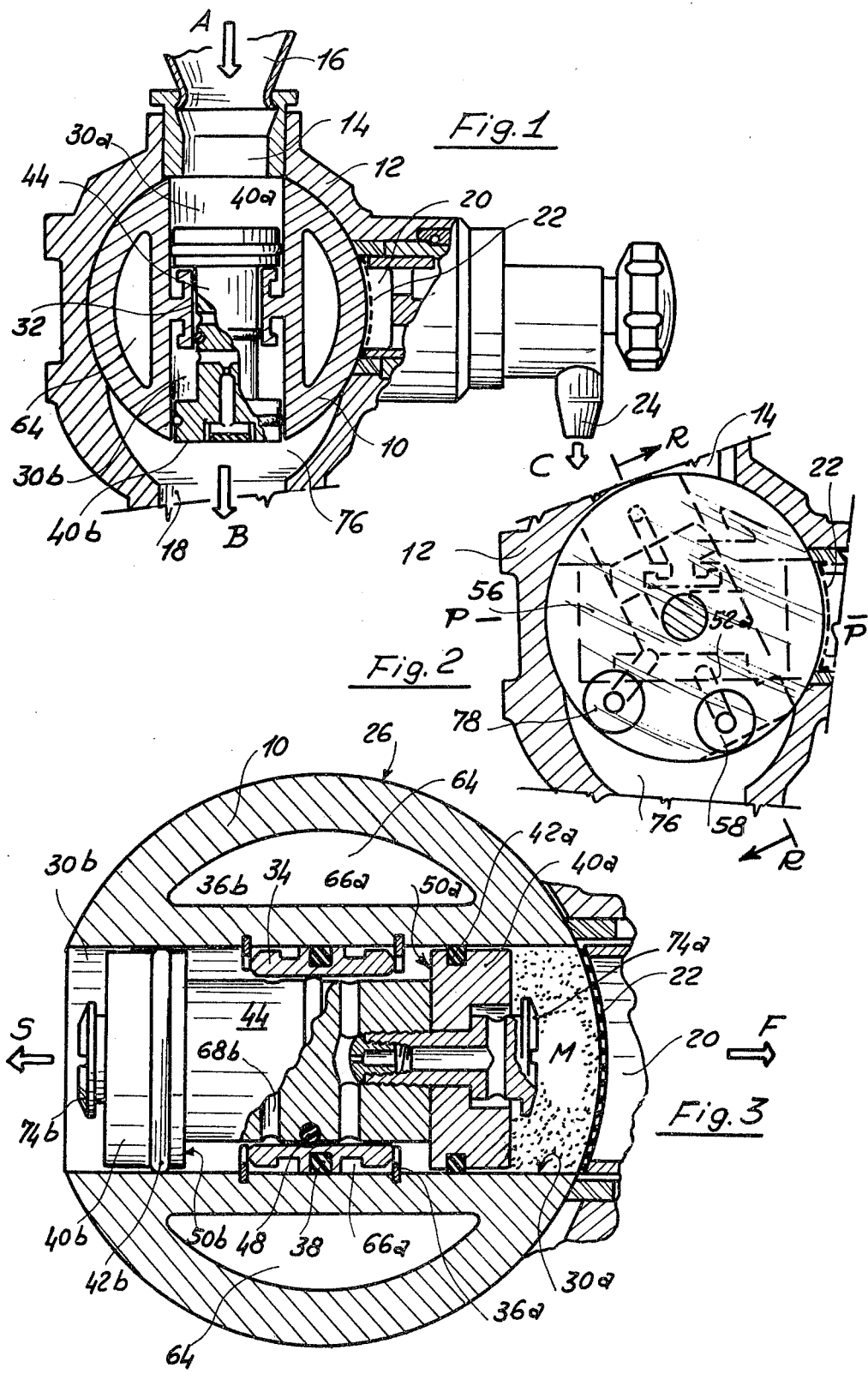

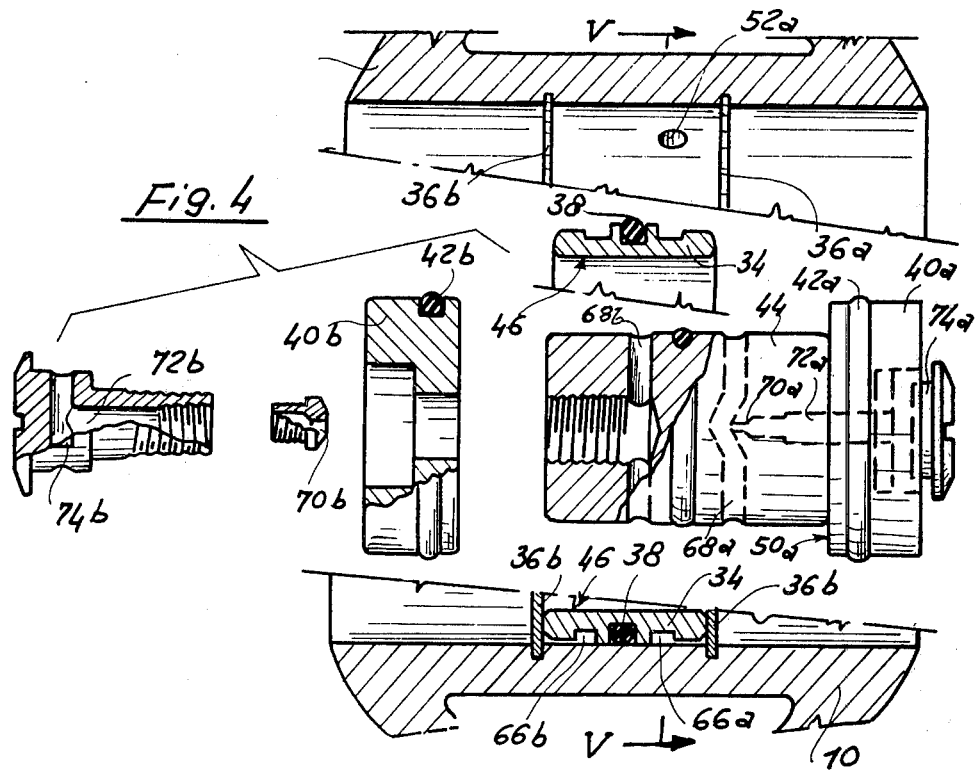
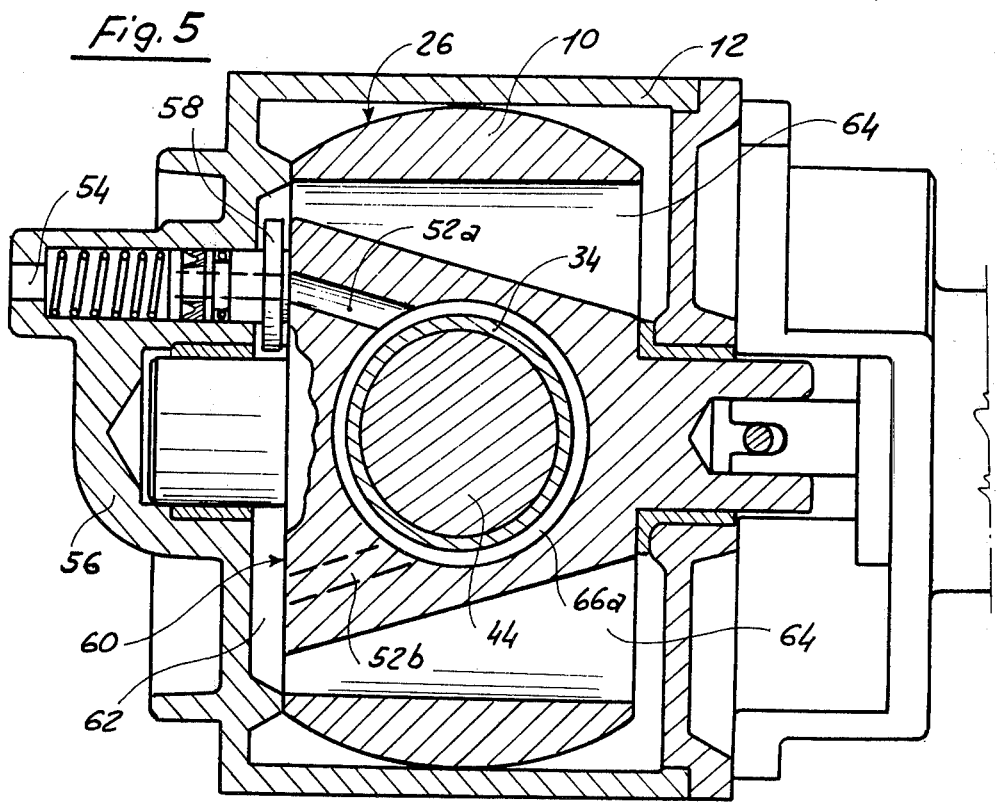

AUTOMATIC COFFEE-MAKING APPARATUS

BACKGROUND OF THE INVENTION a. The Field of the Invention

This invention is concerned with the art of coffee-making devices and, more particularly, it is concerned with a coffee-making apparatus of the automatic type and comprising a drum supported for rotation about a generally horizontal axis within an apparatus casing and formed with diametrally opposed coffee-making cavities, each adapted for sequentially operating at three work stations, upon step-by-step rotation of the drum and consecutive indexing alignment with each of said work stations. Said stations comprise a first station wherein a given amount of fresh ground coffee is supplied within the cavity in alignment therewith, a second station wherein the cavity is facing a coffee screening finely perforated diaphragm and wherein pressurized hot water is caused to pass through the ground coffee in said cavity and over the diaphragm to produce the beverage, and a third station whereat the spent coffee is delivered from the cavity and discharged as waste. The drum is rotated step-by-step so that when any individual cavity is standing in alignment with said first station the diametrally opposed cavity stands facing the third station.

The apparatus is complemented with motor means (generally an electric motor) and control means to provide the desired step-by-step rotational sequence at operator command (the apparatus can adapt for coin triggered operation), with water heating, pressurizing and metering means for supplying the proper amount to be percolated at the second station (water amount adjusting means can be provided) as well as a number of operative subassemblies, each comprising a drum and its casing, which can be associated into a multi-unit apparatus for providing beverage amounts at higher rate, than is provided in one multi-unit machine.

b. The prior Art

This art is well known and worked and a large number of machines of the above type have been widely manufactured and sold. The U.S. Pat. No. 3,593,649 is fairly representative of the art and reference is herein made to the disclosure and drawings of such Patent for full understanding of the general structure and operation of said prior machines and, more particularly, of the several corresponding devices thereof and which, are not forming part of the present invention, will not further described.

In said known apparatus the rotary drum (which will be termed "rotor" as this specification proceeds and in the appended claims, the term encompassing the drum structure and the various elements arranged therein and rotated therewith) comprises a body supported and driven for rotation and having a peripheral wall and two generally planar parallel side faces. According to the teaching of such U.S. Pat. No. 3,592,649, the peripheral wall of the drum is cylindrical and co-axial to the axis of rotation and a part-cylindrical perforated diaphragm is secured to the apparatus casing. An improved shape of such drum and diaphragm has been taught in another U.S. Pat. No. 3,872,782, to the present applicant, wherein the drum peripheral wall has the geometrical configuration of a spherical zone having its centre in the axis of rotation and the diaphragm is correspondingly part-spherically shaped.

The rotor of the present coffee-making apparatus can be provided with a drum having either of such configurations and therefore the expression "peripheral wall" referred to the rotor body will encompass both a cylindrical and spherical zone configuration.

In the prior art machines, their rotors each comprise two physically divided diametrally located opposed cylindrical cavities, each open on said peripheral wall of the drum and wherein a piston shaped member is slidably located for urging a layer of ground coffee, during the operation of the machine, against the perforated diaphragm at the second work station and then downwardly pushing the spent coffee into a discharge passage as waste.

During the operation of the prior art machines, the amount of the pressurized hot water is phasedly supplied, at the percolation second station, by feeding the water into the cylindrical cavity facing the diaphragm, at the rear of the piston, which presses the ground coffee against the diaphragm with a force proportional to the water pressure by the cross-sectional area of the cavity, this pressure before percolation being essential for properly producing the beverage. The water is then progressively and slowly transferred through the piston, provided with passages of very small cross-sectional area, into the space which contains the compacted ground coffee, for percolation.

Further, the delivering of the spent coffee as waste is performed at the third station by supplying a further amount of hot pressurized water at the rear of the piston in the cavity which faces an outlet formed in the casing and connected to a duct to waste outlet. Said further amount of water is of the volume defined by the cross-sectional area of the piston, that is, of the cavity, by the stroke of said piston.

Now, according to the essential features of the invention, there have been found that:

a. while the preliminary pressing and compacting of the layer of the ground coffee between the piston and the perforated diaphragm at the second work station is essential, the percolating hot water cannot properly and uniformly find its way through such compacted layer for properly impregnating same and wetting each coffee particle. Further, the coffee swells when impregnated and the percolation becomes more difficult and uneven. A beverage of a great deal better taste can be produced from a proportionally lesser amount of ground coffee if the percolation will be made through a coffee layer subjected to a pressure far less than that necessary for preliminarily compacting of coffee;

b. from the standpoint of cost of operating the apparatus, a not negligible part is that of the energy used for heating the water. The heat supplied to the above said further amount of hot water, made use of for downwardly driving the pistons at the third work station for delivering of the spent coffee to waste is completely wasted too. On the other hand, not water only can be supplied into the rotor for ensuring the proper temperature level of the unit. Therefore it would be desirable to decrease said further amount of heated water.

It is therefore a principal object of this invention to devise and provide a new and improved coffee-making apparatus or machine which is not subject to the above and other limitations and capable of improved operation both to provide a better percolation of a tasteful beverage and with more economical operation.

SUMMARY OF THE INVENTION

Therefore, the coffee-making apparatus, according to the invention, of the above kind comprising a rotor having diametrically opposed cavities open on its peripheral wall, is essentially and primarily characterized by the fact that it comprises diametrically co-axial cavities connected to each other by a bored passage of cross-sectional area less than that of the cavities wherein the pistons are slidably arranged, by the fact that said pistons are connected for concurrent stroke motion by a component slidably and water-tightly located in said intermediate passage, and by the fact that pressurized hot water supply passages are provided into said rotor, to supply said water at the rear of said pistons in said second and third work stations, in the annular spaces formed about said piston connecting component between the rear face of each piston and the face ends of said intermediate passage.

These and other objects, features and advantages of the invention will be made apparent as this description proceeds. A preferred but not limitative embodiment of the invention will now be detailedly described with reference to the accompanying drawings. In such description and drawings there will be described and shown only the parts, components and assemblies which are critical for the invention and defined as so in the appended claims, while any other structural detail and complemental devices even if necessary for the operation of the machine will not be described and shown as appertaining to the prior art and taught, inter alia, in the above referred to U.S. patents disclosures.

THE SEVERAL VIEWS OF THE DRAWINGS

FIG. 1 is a somewhat diagrammatical fragmentary view of an assembly comprising the rotor and the casing of the apparatus of the invention, the components being illustrated partly in side elevation and principally in cross-sectional view taken in a plane perpendicular to the axis of the rotor and containing the axis of the cavities;

FIG. 2 illustrates part of the casing of FIG. 1 and, diagrammatically, few components of the rotor in two different rotational positions thereof;

FIG. 3 is a more detailed and enlarged view of the rotor, mainly illustrated in sectional view as in FIG. 1, but having its cavities and pistons arranged in the second work station for percolation;

FIG. 4 is a fragmentary exploded view of the rotor of FIG. 3;

FIG. 5 is a cross-sectional view, taken in the plane indicated at V—V in FIG. 4, of same rotor.

DETAILED DESCRIPTION OF THE REFERRED EMBODIMENT

Referring now to the drawings, the apparatus comprises a rotor having a rotor body 10 rotatably supported and step-by-step driven (according to prior art) in a casing 12. The casing is provided with an upper inlet passage 14 connected to a funnel 16 into which a known supply device phasedly supplies metered amounts of fresh ground coffee, in direction as indicated by arrow A, and a lower discharge passage 18 through which the spent coffee can be delivered in direction B as waste. The casing is fixedly secured to or is integrally formed with a side tubular extension wherein a passage 20, provided with a finely perforated diaphragm 22 at its inlet (flush with the inner peripheral wall of the casing), is formed and leads to one or more outlets 24 wherefrom the beverage exits as percolated.

The said supply and discharge passages 14 and 18 are coaxial and vertically or essentially vertically arranged. The axis of the tubular extension and therefore of passage 20 and diaphragm 22 intersects at 90° the common axis of said passages 14 and 18.

The rotor body 10 has a (cylindrical or part-spherical) peripheral wall 26 (FIGS. 3 and 5, the part-spherical configuration being illustrated in FIG. 5) generally mating with that of the casing 12, and the perforated diaphragm 22 is arranged to slide on said wall 26 and to fully cover the outlet of the cavity (described below) aligned with passage 20 at the second work station. Said rotor body has formed thereinto two co-axial diametrically opposed cylindrical cavities 30a and 30b wherein pistons 40a and 40b are respectively slidably arranged.

As far as above described, the structure and the arrangement of parts correspond to prior art. The operation of the apparatus comprises also steps common to prior art, as follows: the rotor is, step-by-step, rotated for 90° each step for sequentially aligning each cavity 30a (30b) with passage 14, with passage 20 and with passage 18. During the first step an amount of fresh ground coffee is supplied in direction A (FIG. 1) in the upturned cavity wherein the piston is downwardly positioned, the cavity being in the first working station. Upon rotation of 90°, the same cavity is transferred to the second station, facing the diaphragm 22 (assuming a clockwise rotation, in the FIGURE) wherein an amount M of ground coffee (see FIG. 3) is pressed against said diaphragm by the pressurized water fed on the back of the piston. The water then slowly passes beyond the piston, wets the coffee, percolates therethrough, filters over the diaphragm in direction F and it exits as a beverage via passage 20 and outlet 24. Upon a further rotation of 90°, the same cavity is downwardly turned above the discharge passage 18 and a further amount of hot pressurized water is supplied on the back of the piston for urging same in the position shown in FIG. 1 for delivering the spent coffee as waste.

In the new apparatus of the invention the oppositely located co-axial cavities 30a and 30b are interconnected by a co-axial intermediate bored passage of cross-sectional area for less than that of said cavities, such as from one half to three fourth of that of cavities 30a and 30b. For simplicity, said intermediate passage is formed within a tubular part 32 illustrated as integrally formed with the rotor body 10. A practical structure is however shown in FIGS. 3 and 4, wherein said passage is formed by the inner cylindrical bore 46 (FIG. 4) of a sleeve 34 secured at the middle of diametral bore which forms of said cavities. The sleeve 34 is axially secured in said diametral bore by suitable means, such as elastic rings 36a and 36b seated into annular grooves, a seal 38, such as an O-ring, being provided for water tight connection between the diametral bore and the sleeve.

The two pistons 40a and 40b, water tightly slidable in said cavities 30a and 30b, respectively, are advantageously provided with running seals 42a and 42b, respectively. This latter feature, which provide effective pressure tightness, is made feasible upon the new arrangement of the invention, which provide a positive action on said pistons, both at their forward and return strokes, as will be shown below. Said pistons 30a and 30b are interconnected by a co-axial cylindrical connecting component 44 lengthwise water-tigthly slidable within the said intermediate passage forming bore 46. A running seal 48 (FIG. 3) can be advantageously provided also for providing water pressure separation between the cavities 30a and 30b.

Therefore, each piston separates the cylindrical cavity wherein it is slidably arranged into two spaces, that is an outer space open on the rotor peripheral wall, the cross-sectional area of which is that of the bore of the cavity, and an inner and annular space defined between the same bore, the external wall of the connecting component 44, the annular rear face 50a (or 50b) of the piston and the outwardly facing end of the sleeve 34. The annular cross-sectional area of each inner space is defined by that of the co-axial opposite cavities forming bore minus that of the connecting component 44, that is the said annular cross-sectional area is preferably from one half to one fourth of that of the cavities.

The duct arrangement and the manner for phasedly supplying hot pressurized water in the cavity in the second station are basically conventional. For example, as rather diagrammatically shown in FIG. 5, a duct 54, connected to a source of hot pressurized water (not shown) secured to a flank portion 56 of casing 12, has a bored outlet 58 slidably abutting on a side face 60 of the rotor body 10. Within said body 10 two passages 52a and 52b are symmetrically and obliquely bored (passage 52 is indicated in phantom lines in FIG. 5) each having its inlet on said side face 60 and its outlet communicating with the one and respectively the other of said annular spaces at the rear of either piston (the outlet of passage 52a can be seen in FIG. 4), said inlets being so arranged (in known manner) so that when the cavity 30a (or the cavity 30b) is at the second percolation station (FIG. 3), the annular space at the rear of piston 40a (or 40b) is connected with the source of hot pressurized water.

Further, each annular space communicates with the cylindrical cavity facing the adjacent piston by further passages bored in the adjacent end portion of connecting component 44 and in members connected to the adjacent piston, such as indicated at 68a, 70a (which is a small choking bore for metered rate of passage), 72a and 74, the latter being formed about the head of a tubular screw which secures the piston 40a to the adjacent end of component 44 and ensures an even spreading of the water in front of said piston. Said arrangement is symmetrically similar in the part adjacent to piston 40b.

The apparatus having the above features, according to the invention, operates in the advantageous manner described below:

Assuming that the rotor is in the position shown in FIG. 3, wherein the cavity 30a, which contains the amount M of fresh ground coffee, is at the second or percolation station, the source of hot pressurized water will be connected (by the indexing of passages shown in FIG. 5) to the annular space at the rear of piston 40a. At first, this piston will be biased in direction F by the pressure of the water of said annular space, the biasing force being given by the pressure by the cross-sectional area of said annular passage, that is, of the annular stepped rear face 50a of the piston. Said force will properly compact the coffee M against the diaphragm 22.

Then, the water will begin to slowly pass in the cavity at the front of piston 30a and to wet the coffee M, which will being to swell in the cavity. The compactness and the swelling of the coffee provide a substantial resistance to percolation and therefore a counterpressure is progressively built-up in the cavity, which provides a counter biasing force in direction S on the piston 30a. It is to be taken into account that such counter force is given by the pressure build-up at the front of piston 30a by the entire cross-sectional area of the cavity and, even if such counter pressure is lowered by the percolation in direction F, by suitable dimensioning of (by experiments) the choking passage at 70a and the relationship between the annular and circular cross-sectional areas, a substantial balance of the biasing forces in directions F and S can be reached, so that the compactness of the coffee M will be substantially decreased and the water will readily and uniformly percolate through any part and contact any particle of coffee M.

It has been experienced that no strict criticalities exist in the above discussed dimensioning and relationship. The above indicated ratios can be further modified and the choking passage 70a can be that which, in the conventional coffee-makers of the type considered, provides the desired slow percolation.

Another important advantage of the invention consists in the fact that a positive action can be applied to provide the return stroke of the piston (to the position of piston 40b in FIG. 1) for positively delivering off the spent coffee to waste, by intermittently supplying pressurized water on the back of the piston. The extra amount of water for providing such positive action (provided by intermittent alignment of the duct with an additional supply outlet at 78 (FIG. 2, while the rotor quickly rotates in direction R from the second to the third station) will be of the volume of said annular space, that is a substantial saving of hot water. Such alignment will be preferably provided while the cavity to be evacuated is nearly in the direction indicated at R in FIG. 2, to anticipate the ejection of the spent coffee which will fall in the discharge passage at 18. The brief burst of pressurized water in the annular space is accompanied by the ejection of hot water in front of the piston, said water being spread about by the passage at 74a and will perfectly clean and deodorize the cavity.

It has been experienced that a machine according to the invention can safely and perfectly hygienically perform many hundred cycles between cleaning operations.

A further important advantage of the invention is provided by the connection between the opposite pistons 40a and 40b, provided by the connecting component 44. The pistons are caused to jointly displace themselves in the cavities and any positively actuated stroke is accompanied by a corresponding motion of the other piston. In particular, the positive downward action applied to the piston at third station provides, together with the outward motion of the piston which ejects the spent coffee to waste, the inward motion of the opposite piston, now being at the first station (FIG. 1) for preparing the upwardly turned cavity to receive a new amount of fresh ground coffee. Such positively actuated storkes make feasible, as indicated above, the provision of unavoidable frictional resistance causing running seals, while in the prior machines for lowering of pistons of first station the own weight only of said pistons can be relied upon, thus preventing the use of desirable and safe elastomeric seals and the like.

I claim:

1. A coffee-making apparatus of the kind comprising a casing connected to a source of hot pressurized water, a rotor supported and driven for step-by-step rotation, said casing having a coffee inlet, a beverage percolation outlet and a spent coffee discharge outlet, said rotor having a peripheral wall, diametrically arranged and oppositely located equal cavities opening on said peripheral wall and oppositely located pistons each slidable in one of said cavities, the casing comprising a finely perforated diaphragm at said percolation outlet facing a cavity aligned with said outlet, said rotor being intermitently rotated for sequentially carrying each cavity to a first station facing said coffee inlet, to a second station facing said percolation outlet and diaphragm, to a third station facing said discharge outlet and then again at the first station for cycle repetition, while the opposite cavity is concurrently carried to face said discharge outlet, wherein the improvement comprises an intermediate passage interconnecting said cavities and having its cross-sectional area less than that of said cavities, an intermediate component interconnecting said pistons sealingly slidable under the action of pressurized water in said intermediate passage, each piston dividing the cavity wherein it sealingly slides into an outer space open at said peripheral wall and an inner annular space defined by said intermediate component, a stepped rear face of the piston, the adjacent face portion of said intermediate passage and the wall of said cavity, the said rotor comprising duct means having their outlet in said annular space whereby hot pressurized water is supplied in said space at said percolation station to bias the piston toward said peripheral wall and compact an amount of fresh ground coffee under a give pressure between said piston and said perforated diaphragm, in said outer space.

2. The apparatus claimed in claim 1, wherein each piston comprises choked passages connecting said annular space to said outer space for progressive transfer of said hot pressurized water from the former to the latter space for wetting the ground coffee, decreasing said given pressure and percolating the beverage.

3. The apparatus claimed in claim 2, wherein each piston has a front face forming the bottom wall of the adjacent outer space and wherein the said choked passage has an inlet formed in said intermediate component facing said annular space and an outwardly radially open outlet on said piston front face.

4. The apparatus claimed in claim 1, wherein the said rotor comprises other duct means to connect a source of hot pressurized water to said annular space when the cavity comprising said space is about at said third station.

5. The apparatus claimed in claim 4, wherein said other duct means are arranged to connect said source to said annular space when the said rotor is rotating for movement from said second to said third station, to apply a brief burst of pressurized water in said cavity briefly before that said cavity reaches said third station.

6. The apparatus claimed in claim 1, wherein said rotor comprises a rotor body having peripheral wall and a diametral bore open at its both ends on said wall and forming at either its outer portions the said opposite cavities, and a bore sleeve secured in the intermediate portion of said bore to form the said intermediate passage, said sleeve having an inner bore wherein the pistons connecting component sealingly slides.

7. The apparatus claimed in claim 6, wherein the said connecting component comprises a cylindrical member of diameter such to provide a clearance between its cylindrical surface and the rotor body bore that an annular space of cross-sectional area from one half to one fourth of that of said rotor bore is formed between said bore and said member.

* * * * *